United States Patent
Kang et al.

(10) Patent No.: US 9,207,720 B2
(45) Date of Patent: Dec. 8, 2015

(54) FLEXIBLE TOUCH SCREEN PANEL AND FABRICATION METHOD THEREOF

(71) Applicant: Samsung Display Co., Ltd., Yongin, Gyeonggi-do (KR)

(72) Inventors: Sung-Ku Kang, Yongin (KR); Tae-Hyeog Jung, Yongin (KR); Kyu-Young Kim, Yongin (KR); Byeong-Kyu Jeon, Yongin (KR); Jung-Yun Kim, Yongin (KR); In-Nam Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 169 days.

(21) Appl. No.: 13/849,357

(22) Filed: Mar. 22, 2013

(65) Prior Publication Data

US 2014/0152910 A1 Jun. 5, 2014

(30) Foreign Application Priority Data

Nov. 30, 2012 (KR) ........................ 10-2012-0138193

(51) Int. Cl.
*G02F 1/1335* (2006.01)
*G06F 1/16* (2006.01)
*G06F 3/044* (2006.01)

(52) U.S. Cl.
CPC .............. *G06F 1/169* (2013.01); *G06F 1/1643* (2013.01); *G06F 1/1652* (2013.01); *G06F 3/044* (2013.01)

(58) Field of Classification Search
CPC ... G02F 1/13338; G06F 3/044; G06F 3/0488; G06F 3/04883
USPC ..................................... 349/12; 345/173–174
See application file for complete search history.

(56) References Cited

U.S. PATENT DOCUMENTS

| 8,049,333 | B2 | 11/2011 | Alden et al. | |
|---|---|---|---|---|
| 2008/0264699 | A1 | 10/2008 | Chang et al. | |
| 2010/0007621 | A1* | 1/2010 | Kang et al. | 345/173 |
| 2010/0073310 | A1 | 3/2010 | Liang et al. | |
| 2011/0234510 | A1* | 9/2011 | Jeong et al. | 345/173 |
| 2011/0267290 | A1* | 11/2011 | Park et al. | 345/173 |
| 2013/0194205 | A1* | 8/2013 | Park et al. | 345/173 |

FOREIGN PATENT DOCUMENTS

| KR | 10-2008-0066658 A | 7/2008 |
|---|---|---|
| KR | 10-2010-0054899 A | 5/2010 |
| KR | 10-2011-0127429 A | 11/2011 |

* cited by examiner

*Primary Examiner* — Thanh-Nhan P Nguyen
(74) *Attorney, Agent, or Firm* — Knobbe Martens Olson & Bear LLP

(57) ABSTRACT

A flexible touch screen panel with sensing electrodes formed of different materials is disclosed. In one aspect, the panel includes a substrate, a plurality of first and second sensing electrodes, a plurality of first and second position detection lines, and a pad portion. The substrate is divided into an active area, and first and second non-active area formed at the outside of the active area. The plurality of first sensing electrodes are arranged along a first direction and the plurality of second sensing electrodes are arranged along a second direction in the active area. The plurality of first and second position detection lines are formed in the first non-active area, and respectively connected to the plurality of first and second sensing electrodes. The pad portion is formed in the second non-active area, and has a plurality of pads electrically connected to the plurality of first and second position detection lines. The first and second sensing electrodes are formed of different materials from each other.

18 Claims, 3 Drawing Sheets

FLEXIBLE TOUCH SCREEN PANEL AND FABRICATION METHOD THEREOF

CROSS-REFERENCE TO RELATED APPLICATIONS

This application claims priority to and the benefit of Korean Patent Application No. 10-2012-0138193, filed on Nov. 30, 2012, in the Korean Intellectual Property Office, the entire content of which is incorporated herein by reference.

BACKGROUND

1. Field

An aspect of the disclosed technology relates to a touch screen panel, and more particularly, to a flexible touch screen panel and a fabrication method thereof.

2. Description of the Related Technology

A touch screen panel is an input device that through (often, capacitive) contact sensing allows a user's instruction to be manually input by selecting a portion of display that contains a visual cue or instruction content such as an icon.

To this end, the touch screen panel is formed on a display face of an image display device to convert a contact position into an electrical signal. Here, the user's finger(s) or object, such as a stylus, is placed directly in contact with the panel at the contact position. Accordingly, the selection of instruction content at the contact position is received as an input signal to the display.

Since such a touch screen can be substituted for a separate input device, such as a keyboard or mouse, connected to the machine that includes the display, e.g., a mobile tablet or smartphone, its fields of application have been expanding.

In general, touch screen panels employ technologies that can be categorized into resistive overlay, photosensitive, capacitive, and the like. Among these technologies, the capacitive type converts a contact position into an electrical signal by sensing a change in capacitance formed between a conductive sensing electrode and an adjacent sensing electrode or ground electrode when contact is made with a portion of the touch screen panel.

Generally, such a touch screen panel is frequently commercialized by being attached to the display side of a flat panel display device such as a liquid crystal display (LCD) or organic light emitting diode (OLED) display. Therefore, when used as an overlay, a touch screen panel requires characteristics of high transparency and minimal thickness.

Flexible image display device have been developed and commercialized, and naturally, an attached touch screen panel also requires flexibility. In general, the sensing electrodes are implemented using a transparent conductive material. However, when the flexible touch screen panel is bent or folded, cracks occur in the sensing electrodes, and therefore, open circuits cause no capacitive signals to be generated along the lines of broken electrodes causing the entire display to no longer be of use.

In touch screen manufacturing, subprocesses including a thin-film growth process, a pattern formation process, and the like are necessary for forming the sensing electrodes and the like, and therefore, characteristics such as high thermal resistance and chemical resistance are required. Accordingly, the sensing electrodes and related electrical lines are formed on a glass substrate according to the resultant process characteristics. However, in the manufacturing of a rigid display, the glass substrate should have a certain amount of thickness so as to be carried during processes. Therefore, the glass substrate does not satisfy characteristics requiring the reduced thickness and will not be flexible.

SUMMARY OF CERTAIN INVENTIVE ASPECTS

Certain embodiments relate to a flexible touch screen panel in which first sensing electrodes and second sensing electrodes formed on one surface of a substrate having flexibility are implemented using different materials.

Other embodiments relate to a fabrication method of a flexible touch screen panel, in which an insulation layer formed on first sensing electrodes and second sensing electrodes are simultaneously formed through the same process.

Further embodiments relate to a flexible touch screen panel in which a connecting portion connecting between position detection lines connected to first and second sensing electrodes and pads connected to an external touch driving circuit is implemented into a multi-layered line structure, thereby overcoming a disconnection caused by over etching.

One aspect of the disclosed technology, is a flexible touch screen panel, comprising: a substrate divided into an active area, and at least one non-active area formed outside of the active area; a plurality of first sensing electrodes arranged along a first direction and a plurality of second sensing electrodes arranged along a second direction in the active area; a plurality of first and second position detection lines formed in the non-active area, and respectively connected to the plurality of first and second sensing electrodes; and a pad portion formed in the non-active area, and having a plurality of pads electrically connected to the plurality of first and second position detection lines, wherein the first and second sensing electrodes are formed of different materials from each other.

The first sensing electrodes include a plurality of first sensing cells arranged along the first direction, and first connection patterns connecting the first sensing cells to each other. The first sensing cells have a mesh shape including a plurality of openings. The first sensing electrodes and the first position detection lines are formed of an opaque metal material.

The second sensing electrodes include a plurality of second sensing cells arranged along the second direction, and second connection patterns connecting the second sensing cells to each other. The second sensing electrodes and the second position detection lines may be formed by patterning a nano-metal conductive layer.

The nano-metal conductive layer is formed of a compound having a stacked structure of a photosensitive organic layer and a conductive network layer configured with a plurality of metallic nano-wires. The metallic nano-wires are formed as silver nano-wires (AgNW).

The second sensing cells and the second connection patterns are implemented by patterning the conductive network layer formed in the uppermost layer of the compound. The nonactive area comprises first and second non-active areas and wherein the photosensitive organic layer is formed on a region overlapped with the active area and the first non-active area but not the second non-active area.

The flexible touch screen panel further comprises a plurality of first and second connecting portions formed on the second non-active area, and respectively connecting the plurality of first and second position detection lines and the pads corresponding thereto. The connecting portions may be implemented into a multi-layered line structure.

The first sensing electrodes and the first position detection lines connected thereto are formed on one surface of the substrate, and the second sensing electrodes and the second position detection lines connected thereto are formed on the photosensitive organic layer.

The first connecting portion is implemented with a first lower line formed on the substrate, and a first upper line overlapped with the first lower line and having one end extended on the photosensitive organic layer. The first lower line may be implemented by extending, to the second non-active area, the first position detection line formed on the first non-active area of the substrate. The first upper line may be simultaneously formed with the second sensing electrodes and the second position detection lines.

The second connecting portion is implemented with a second lower line formed on the substrate and having one end partially extended beneath the photosensitive organic layer, and a second upper line overlapped with the second lower line and connected to the second position detection line formed on the photosensitive organic layer.

The second upper line is implemented by extending, to the second non-active area, the second position detection line formed on the photosensitive organic layer of the first non-active area. The second lower line is simultaneously formed with the first sensing electrodes and the first position detection lines.

Another aspect of the disclosed technology, is a fabrication method of a flexible touch screen panel, the method comprising: forming a plurality of first sensing electrodes and first position detection lines connected thereto on a first surface of a substrate; forming a nano-metal conductive compound implemented into a stacked structure of a photosensitive organic layer and a conductive network layer on the substrate on which the first sensing electrodes and the first position detection lines are formed; and patterning the conductive network layer formed in the uppermost layer of the nano-metal conductive compound, thereby forming second sensing electrodes arranged to intersect with the first sensing electrodes and second position detection lines connected to the second sensing electrodes.

As described above, according to the disclosed technology, first and second sensing electrodes of the touch screen panel are formed of different materials having flexibility, so that it is possible to secure the flexibility of the touch screen panel and to reduce the thickness of the touch screen panel.

Further, an insulation layer formed on the first sensing electrodes and the second sensing electrodes are simultaneously formed through the same process, thereby simplifying the fabrication process of the touch screen panel.

Further, a connecting portion connecting between position detection lines connected to first and second sensing electrodes and pads connected to an external touch driving circuit is implemented into a multi-layered line structure, thereby overcoming a disconnection caused by over etching.

BRIEF DESCRIPTION OF THE DRAWINGS

The accompanying drawings, together with the specification, illustrate exemplary embodiments of the disclosed technology, and, together with the description, serve to explain the principles of the disclosed technology.

DETAILED DESCRIPTION OF CERTAIN INVENTIVE EMBODIMENTS

Figure 1:
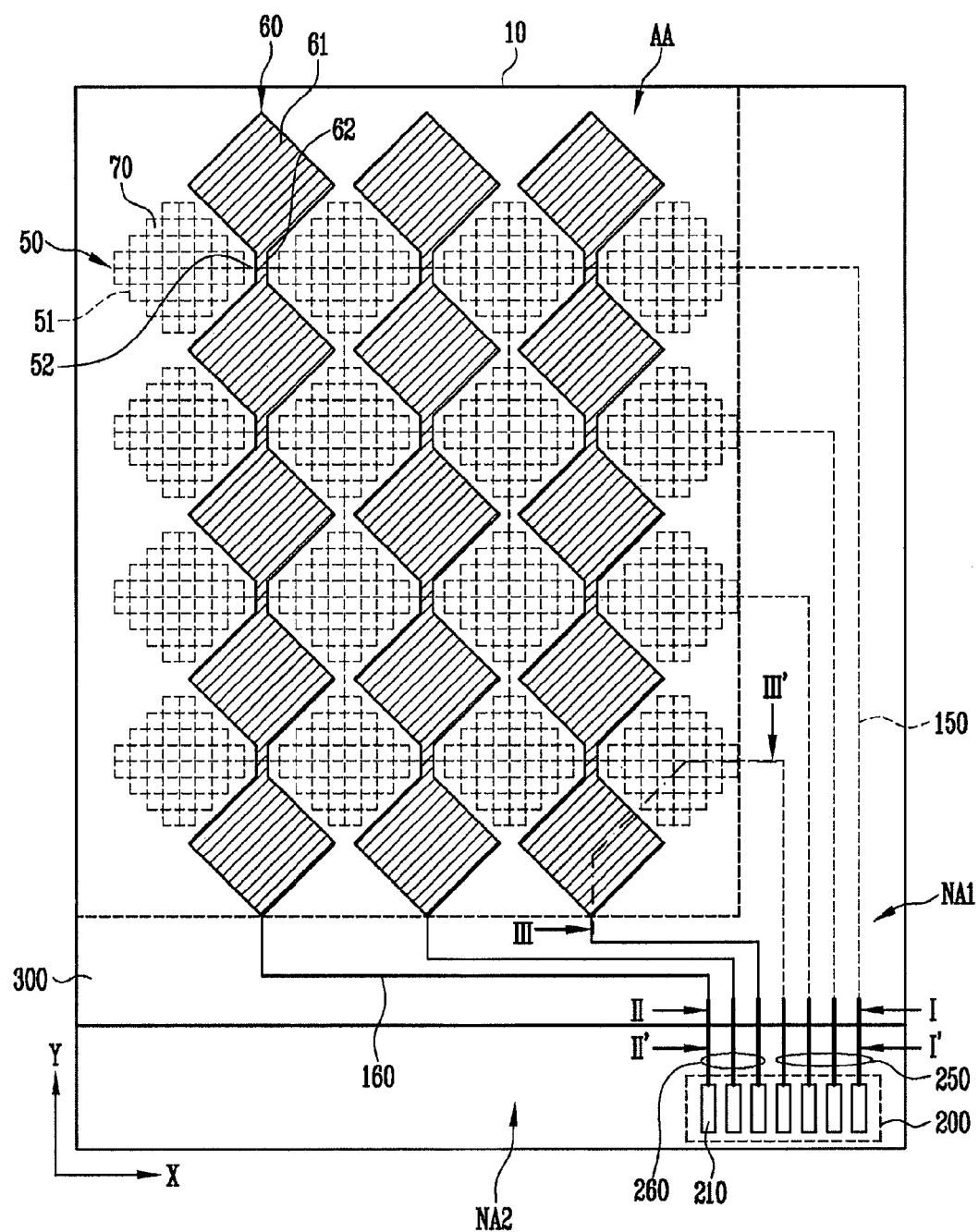
FIG. 1 is a plan view showing a touch screen panel according to an embodiment of the disclosed technology.

In the following detailed description, only certain exemplary embodiments of the disclosed technology have been shown and described, simply by way of illustration. As those skilled in the art would realize, the described embodiments may be modified in various different ways, all without departing from the spirit or scope of the disclosed technology. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments of the disclosed technology will be described in detail with reference to the accompanying drawings.

Figure 2A:
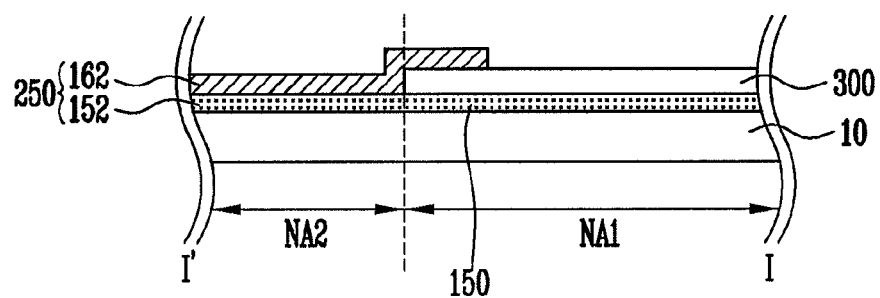
FIGS. 2A and 2B are respectively sectional views taken along lines I-I' and II-II' of the touch screen panel shown in FIG. 1.
Figure 2B:
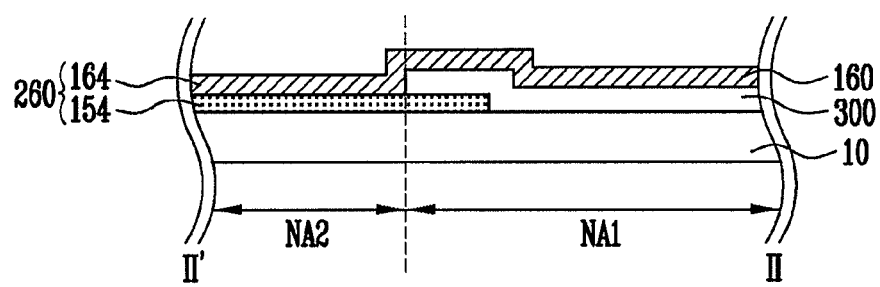

FIG. 1 is a plan view showing a touch screen panel according to an embodiment of the disclosed technology. FIGS. 2A and 2B are respectively sectional views taken along lines I-I' and II-II' of the touch screen panel shown in FIG. 1.

Referring to FIGS. 1, 2A and 2B, the touch screen panel according to this embodiment includes a flexible substrate 10, first and second sensing electrodes 50 and 60 formed on one surface of the substrate 10, first and second position detection lines 150 and 160 electrically connecting the first and second sensing electrodes 50 and 60 to a plurality of pads 210 positioned in a pad portion 200.

The touch screen panel according to this embodiment further includes first and second connecting portions 250 and 260 connecting between the first and second position detection lines 150 and 160 and the pads 210. In this case, the first and second connecting portions 250 and 260 are implemented as lines with a multi-layered structure.

Here, the area on which the sensing electrodes 50 and 60 are formed is an active area AA on which an image is displayed to detect a touch position, and the area on which the position detection lines 150 and 160, the connecting portions 250 and 260 and the pad portion 200 are formed is a non-active area NA provided at the outside of the active area AA.

In this embodiment, the non-active area NA is divided into a first non-active area NA1 and a second non-active area NA2. Here, the position detection lines 150 and 160 are formed on the first non-active area NA1. The second non-active area NA2 is positioned at the outside of the first non-active area NA1, and the connecting portions 250 and 260 connecting between the position detection lines 150 and 160 and the respective pads 210 provided in the pad portion 200 are formed on the second non-active area NA2.

As shown in FIG. 1, the first sensing electrode 50 is formed long along a first direction (e.g., an X-axis direction), and may be arranged in plural numbers along a second direction (e.g., a Y-axis direction) intersecting the first direction.

The second sensing electrode 60 is formed along the second direction, and is typically arranged as multiple parallel lines along the first direction.

The sensing electrodes 50 and 60 according to this embodiment are preferably formed of a flexible conductive material. This is to prevent the known drawback of the transparent conductive material (e.g., indium tin oxide (ITO)) which has been used as the material for forming existing sensing electrodes, i.e., an operational failure caused due to the occurrence of cracks in the sensing electrodes when the flexible touch screen panel is bent or folded.

Particularly, in this embodiment, the first sensing electrodes 50 and first position detection lines 150 connected thereto are formed on the one surface of the substrate 10, and the second sensing electrodes 60 and the second position detection lines 160 connected thereto are formed on an insulation layer 300

The first and second sensing electrodes 50 and 60 are formed of different materials from each other. For example, the first sensing electrode 50 may be formed of a metal mesh shape implemented with fine lines, and the second sensing electrode 60 may be formed of a nano-metal conductive layer. For examples of specific metals and alloys, low-resistance metal such as Ag, Al, Cu, Cr or Ni as opaque metal may be used as the conductive material of the first sensing electrode 50, and silver nano-wires (AgNW) may be used as the second sensing electrode 60. Naturally, embodiments of the disclosed technology are not limited thereto. In some embodiments, the nano-metal conductive layer includes a plurality of metallic nano-wires such as silver nano-wires (AgNW). The nano-metal conductive layer is implemented by forming a conductive network layer with the metallic nano-wires. In such embodiments, the nano-metal conductive layer is implemented into a structure in which the network layer of the metallic nano-wires is mixed with a photosensitive organic layer. The photosensitive organic layer performs the function of the insulation layer 300 formed between the first and second sensing electrodes 50 and 60.

Since ITO or the like used as a material for many existing sensing electrodes having unsatisfactory flexibility, cracks easily occur in the sensing electrodes when they are formed on the flexible touch screen panel. However, in embodiments where the metal mesh shape formed of the opaque metal and the nano-metal conductive layer are used in embodiments, the occurrence of cracks is less than that when the ITO is used. Accordingly, the metal mesh shape and the nano-metal conductive layer can be readily formed on the flexible touch screen panel.

In embodiments where the sensing electrodes 50 and 60 are formed of metal having resistance relatively lower than that of the ITO, it is possible to decrease the RC delay inherent in capacitive devices such as overlapping electrodes.

However, embodiments where the first sensing electrode 50 having the metal mesh shape is formed of the opaque metal material, a user can view the first sensing electrode 50 as the peculiar reflection gloss and surface reflexibility of the opaque metal increases.

In order to overcome such a disadvantage, in this embodiment, a polarizing film (not shown) having flexibility is formed on the substrate 10 having the first sensing electrodes 50 formed thereon, so that it is possible to remove the peculiar reflection gloss and to decrease the surface reflexibility, thereby solving the visibility problem of the sensing electrodes.

In this case, the substrate 10 having the sensing electrodes may be implemented with a non-oriented polycarbonate (PC) or cyclic polyolefin (COP) film as a low retardation film positioned beneath the polarizing film and made of a flexible material.

The substrate 10 may perform the function of a retardation film provided in the polarizing film. In this case, the substrate 10 may be implemented with a PC, oriented poly propylene (OPP) or poly vinyl alcohol (PVA) film having a retardation function.

Hereinafter, detailed configurations of certain embodiments of the first and second sensing electrodes 50 and 60 will be described as follows.

Referring to FIG. 1, the first sensing electrodes 50 may be configured with a plurality of first sensing cells 51 arranged along the first direction, and first connection patterns 52 electrically connecting the first sensing cells 51 to each other. The second sensing electrodes 60 may be configured with a plurality of second sensing cells 61 arranged along the second direction, and second connection patterns 52 electrically connecting the second sensing cells 61 to each other.

Here, a plurality of openings 70 are formed in the first sensing cell 51 as shown in FIG. 1, and accordingly, the first sensing electrode 50 having the mesh shape is implemented. In this case, the line widths of the first sensing cell 51 and the first connection pattern 52 can be implemented to have about 5 to 15 μm or less.

The second sensing electrode 60 is formed by patterning the nano-metal conductive layer described above into the second sensing cell 51 and the second connection pattern 62, shown in FIG. 1.

The nano-metal conductive layer is implemented by forming a conductive network layer with a plurality of metallic nano-wires such as silver nano-wires (AgNW). In this embodiment, the nano-metal conductive layer is implemented into a structure in which the conductive network layer is mixed with a photosensitive organic layer.

Here, the mixed structure of the conductive network layer and the photosensitive organic layer is implemented as a stacked structure of the photosensitive organic layer and the conductive network layer.

Thus, in these embodiments, the second sensing cell 61 and the second connection pattern 62 are formed by patterning only the conductive network layer, and the photosensitive organic layer formed beneath the conductive network layer can perform the function of the insulation layer 300 between the first and second electrodes 50 and 60.

That is, the photosensitive organic layer performs the function of patterning the conductive network layer and the function of the insulation layer.

In the embodiment shown in FIG. 1, the first and second sensing cells 51 and 61 may have a diamond shape, but naturally the disclosed technology is not limited thereto.

Particularly, a display panel in which a plurality of pixels are regularly arranged to display an image is disposed below the substrate 10 having the sensing cells 51 formed thereon. In embodiments where the shape and arrangement of the sensing cells 51 have regularity, a Moire phenomenon occurs due to interference between the pixels in the display panel, and therefore, it is likely that the display quality may be compromised. Accordingly, such problem can be overcome by forming the outlines of the sensing cells 51 in the shape of a curve or a random curve.

However, for convenience of illustration, a case where the sensing cells 51 and 61 are implemented in the same diamond shape as shown in FIG. 1 will be described as an example in this embodiment.

The first position detection lines 150 are connected to one ends of the first sensing electrodes 50, respectively, and the second position detection lines 160 are connected to one ends of the second sensing electrodes 60, respectively. The first and second position detection lines 150 and 160 will transmit signals detected from the sensing electrodes 50 and 60 to an external touch driving circuit (not shown) via the first and second connecting portions 250 and 260 and the pads 210 provided in the pad portion 200.

That is, the touch driving circuit receiving the signal transmitted through the first and second position detection lines 150 and 160 can detect the precise position of a user's touch on the screen.

In another embodiment, the first and second electrodes 50 and 60 may be operated as electrodes using a mutual capacitive method in which the first sensing electrode 50 is used as a sensing electrode (Rx) and the second sensing electrode 60 is used as a driving electrode (Tx).

In this case, the first position detection lines 150 may be formed of the same material as the first sensing electrodes 50 connected thereto, and the second position detection lines 160 may be formed of the same material as the second sensing electrodes 60 connected thereto.

That is, low-resistance metal such as Ag, Al, Cu, Cr or Ni as opaque metal may be used as the conductive material of the first position detection line 150, and silver nano-wires (AgNW) may be used as the second position detection line 160.

Thus, the position detection lines 150 and 160 can be formed through the same process as the sensing electrodes 50 and 60, so that the fabrication process of the touch screen panel can be further simplified.

In such embodiments, the first sensing electrodes 50 and the first position detection lines 150 connected thereto may be formed on the one surface of the substrate 10, and the second sensing electrodes 60 and the second position detection lines 160 connected thereto may be formed on the insulation layer 300.

Accordingly, in such embodiments, the sensing electrodes 50 and 60 are implemented as sensing electrodes having a two-layered structure in which the insulation layer 300 is formed between the first and second sensing electrodes 50 and 60. In the two-layered structure, the fabrication process is further simplified, as compared with the single-layered structure in which a separate insulation layer is formed at a portion at which the first and second sensing electrodes 50 and 60 intersect with each other, i.e., between the first and second connection patterns 52 and 62.

Particularly, in this embodiment, the insulation layer 300 is formed of the photosensitive organic layer used in the patterning of the second sensing electrode 60 as described above, thereby omitting the process of forming the separate insulation layer.

In this case, as shown in FIG. 1, the insulation layer 300 is formed only on the region in which the active area AA and the first non-active area NA1 overlap with each other. The insulation layer 300 is not formed on the second non-active area NA2 on which the pad portion 200 and the connecting portions 250 and 260 are formed.

This is for the purpose that the pad portion 200 is easily pressure-bonded to a flexible printed circuit board (FPCB, not shown) having the touch driving circuit mounted thereon.

That is, in embodiments where the insulation layer 300 is formed to extend up to the second non-active area NA2, a separate patterning process is necessarily performed on the region of the insulation layer overlapped with the plurality of pads 210 provided to the pad portion 200 so that the pads 210 are exposed. Therefore, the fabrication process is complicated, and time and cost increase. According to this embodiment, in order to minimize such disadvantages in the fabrication process, the insulation layer 300 is not extended up to the second non-active area NA2 but formed only up to the region of the insulation layer overlapped with the first non-active area NA1.

In this case, the first connecting portion 250 connected between the first position detection lines 150 and the pads 210 is positioned on the second non-active area NA2, and is exposed without being protected by the insulation layer 300. Hence, the first connecting portion 250 may be disconnected by over-etching in a patterning process of the second sensing electrodes 60 and the second position detection lines 160, positioned on the insulation layer 300.

In case of the second connecting portion 260 connected between the second position detection lines 160 and the pads 210, the second position detection lines 160 are formed on the insulation layer 300, and the second connecting portion 260 is positioned on the second non-active area NA2 at the edge portion of the end of the insulation layer 300. Therefore, the connection between the second position detection lines 160 and the second connecting portion 260 may be disconnected due to a step difference caused by the thickness of the insulation layer 300.

According to this embodiment, in order to solve such a problem, the first and second connecting portions 250 and 260 connecting between the first and second position detection lines 150 and 160 and the pads 210 are implemented as lines with a multi-layered structure.

The sectional structures of the first and second connecting portions 250 and 260 will be described in detail with reference to FIGS. 2A and 2B.

First, FIG. 2A is a view showing the sectional structure of the first connecting portion 250. As shown in FIG. 2A, the first connecting portion 250 may be implemented into a multi-layered line structure of a first lower line 152 formed on the substrate 10 and a first upper line 162 overlapped with the first lower line 152 and having one end extended on the insulation layer 300.

In this case, the first lower line 152 is integrally connected to the first position detection line 150 as shown in FIG. 2A. The first position detection line 150 formed on the substrate 10 of the first non-active area NA1 may be implemented to extend to the second non-active area NA2. That is, the lower line 152 is the first position detection line 150 extended to the second non-active area NA2 on which the insulation layer 300 is not formed.

In embodiments where the first connecting portion 250 is implemented with only the first lower line 152 as described above, the first connecting portion 250 may be disconnected by the over-etching in a patterning process of the second sensing electrodes 60 and the second position detection lines 160, positioned on the insulation layer 300 as described above. Thus, in this embodiment, the first upper line 162 is formed on the first lower line 152 so as to overlap with the first lower line 152.

In such embodiments, the first upper line 162 is simultaneously formed with the second sensing electrodes 60 and the second position detection lines 160. Here, the first upper line 162 is formed to prevent the over-etching of the first lower line 152 formed by extending the first position detection line 150 to the second non-active area NA2. Hence, the first upper line 162 is not electrically connected to the second position detection lines 160 in a floating state.

Thus, as shown in FIG. 2A, the first upper line 162 is implemented into a structure in which the first upper line 162 overlaps with the first lower line 152 corresponding thereto and has one end extended on the insulation layer 300 and then broken.

Next, FIG. 2B is a view showing a sectional structure of the second connecting portion 260. As shown in FIG. 2B, the second connecting portion 260 is implemented into a multi-layered structure of a second lower liner 154 formed on the substrate 10 and having one end partially extended beneath the insulation layer 300, and a second upper line 164 overlapped with the second lower line 154 and connected to the second position detection line 160 formed on the insulation layer 300.

In this case, the second upper line 164 is integrally connected to the second position detection line 160 as shown in FIG. 2B. The second upper line 164 is implemented by extending the second position detection line 160 formed on the insulation layer 300 of the first non-active area NA1 to the second non-active area NA2. That is, the second upper line 164 is the second position detection line 160 extended to the second non-active area NA2 on which the insulation layer 300 is not formed.

In embodiments where the second connecting portion 260 is implemented with only the second upper layer 164 as described above, the connection between the second position detection lines 160 and the second connecting portion 260 may be disconnected due to the step difference caused by the thickness of the insulation layer 300 as described above. Accordingly, in this embodiment, the second lower line 154 is formed beneath the second upper line 164 so as to overlap with the second upper line 164.

In various embodiments, the second lower line 154 is simultaneously formed with the first sensing electrodes 50 and the first position detection lines 150. Here, the second lower line 154 is formed to compensate for the step difference of the second upper line 164 formed by extending the second position detection line 160 to the second non-active area NA2. Hence, the second lower line 154 is not electrically connected to the first position detection lines 150 in a floating state.

Thus, as shown in FIG. 2B, the second lower line 154 is implemented into a structure in which the second lower line 154 overlaps with the second upper line 164 corresponding thereto and has one end extended beneath the insulation layer 300 and then broken.

Figure 3A:
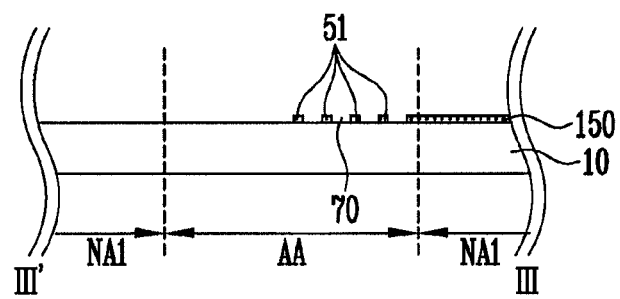
FIGS. 3A to 3C are sectional views illustrating a fabrication method of the touch screen panel according to an embodiment of the disclosed technology.
Figure 3B:
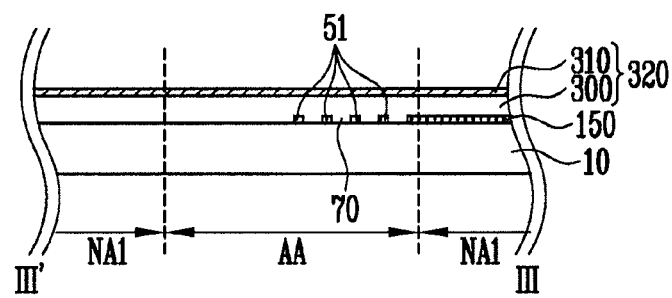
Figure 3C:
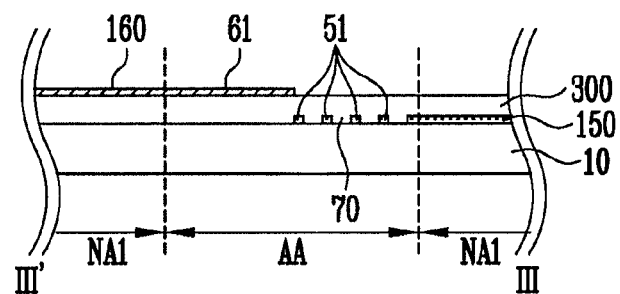

FIGS. 3A to 3C are sectional views illustrating a fabrication method of the touch screen panel according to an embodiment of the disclosed technology.

Here, FIGS. 3A to 3C are process sectional views showing a specific region (III-III') of FIG. 1, which are sectional views showing first and second sensing cells 51 and 61 formed at an end of the active area AA, and first and second position detection lines 150 and 160 formed on the first non-active area NA1 connected to the first and second sensing cells 51 and 61.

First, referring to FIGS. 1 and 3A, first sensing electrodes 50 formed long along a first direction (e.g., an X-axis direction) are formed on an active area AA of a substrate 10, and first position detection lines 150 connected to the first sensing electrodes 50 are formed on a first non-active area NA1 of the substrate.

The first sensing electrodes 50 are configured with a plurality of first sensing cells 51 arranged along the first direction, and first connection patterns 52 electrically connecting the first sensing cells 51 to each other. The first sensing cell 51 is shown in FIG. 3A.

In this embodiment, a plurality of openings 70 are formed in the first sensing cell 51 as shown in FIG. 3A, and accordingly, the first sensing electrode 50 having the mesh shape is implemented. In this case, the line widths of the first sensing cell 51 and the first connection pattern 52 are preferably implemented to have about 5 to 15 μm or less.

A first position detection line 150 is connected to the first sensing cell 51 at one end of the first sensing cell 51. The first position detection line 150 may be formed of the same material as the first sensing cell 51 connected thereto.

That is, low-resistance metal such as Ag, Al, Cu, Cr or Ni as opaque metal may be used as the material of the first sensing cell 51 and the first position detection line 150, and the first position detection line 150 and the first sensing electrode 50 are formed through the same process, thereby further simplifying the fabrication process.

Next, referring to FIG. 3B, a mixed material of a photosensitive organic layer 300 and a conductive network layer 310 configured with a plurality of metallic nano-wires is formed on the substrate 10 on which the first sensing cell 51 and the first position detection line 150 are formed.

In this case, the conductive network layer 310 is configured with the plurality of metallic nano-wires such as silver nano-wires (AgNW). The conductive network layer 310 is buried in the matrix of the photosensitive organic layer 300, thereby implementing a nano-metal conductive compound 320.

Here, the nano-metal conductive compound 320 is implemented into a stacked structure of the photosensitive organic layer 300 and the conductive network layer 310 as described above. The compound 320 may be formed on the substrate 10 using a lamination method.

Subsequently, referring to FIGS. 1 and 3C, second sensing electrodes 60 are formed by patterning only the conductive network layer 310 formed in the uppermost layer of the compound.

The second sensing electrodes 60 are configured with a plurality of second sensing cells 61 arranged along the second direction, and second connection patterns 52 electrically connecting the second sensing cells 61 to each other. The second sensing cell 61 is shown in FIG. 3C.

A second position detection line 160 formed on the first non-active area NA1 of the substrate 10 is connected to the second sensing cell 61 at one end of the second sensing cell 61. The second position detection line may be formed of the same material as the second sensing cell 61 connected thereto.

That is, the second sensing cell 61 and the second position detection line 160 are formed by patterning the conductive network layer 310 formed in the uppermost layer of the nano-metal conductive compound 320.

In this case, the photosensitive organic layer 300 positioned beneath the compound 320 performs the function of patterning the second sensing cell 61 and the second position detection line 160 through a photolithography process.

Generally, in embodiments where a metal layer is patterned through the photolithography process, the photosensitive organic layer is positioned on the metal layer. However, in this embodiment, the conductive network layer 310 has transparency in which light is transmitted therethrough. Thus, although the photosensitive organic layer 300 is formed beneath the conductive network layer 310, the conductive network layer 310 can be patterned into a predetermined pattern through the photolithography process.

The photosensitive organic layer 300 formed in the active area AA and the first non-active area NA1 is not etched in the photolithography process. Thus, the photosensitive organic layer 300 can perform the function of the insulation layer 300 interposed between the first and second sensing electrodes 50 and 60.

That is, the photosensitive organic layer 300 performs the function of patterning the conductive network layer and the function of the insulation layer.

The first and second sensing electrodes 50 and 60 positioned on the active area AA and the first non-active area NA1 of the substrate 10, and the first and second position detection lines 150 and 160 connected to the first and second sensing electrodes 50 and 60 are formed through the processes of FIGS. 3A to 3C.

The first and second position detection lines 150 and 160 are electrically connected to the respective pads 210 of the pad portion 200 through the connecting portions 250 and 260 formed on the second non-active area NA2 as shown in FIGS. 2A and 2B.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible touch screen panel, comprising:
a substrate divided into an active area, and at least one non-active area formed outside of the active area, wherein the non-active area comprises first and second non-active areas;
a plurality of first sensing electrodes arranged along a first direction and a plurality of second sensing electrodes arranged along a second direction in the active area; and
a plurality of first and second position detection lines formed in the non-active area, and respectively connected to the plurality of first and second sensing electrodes,
wherein the second sensing electrodes and the second position detection lines comprise a nano-metal conductive layer,
wherein the nano-metal conductive layer is formed of a compound having a stacked structure of a photosensitive organic layer and a conductive network layer configured with a plurality of metallic nano-wires, and
wherein the photosensitive organic layer is formed on a region overlapping the active area and the first non-active area but not the second non-active area.

2. The flexible touch screen panel of claim 1, wherein the first sensing electrodes include a plurality of first sensing cells arranged along the first direction, and first connection patterns connecting the first sensing cells to each other.

3. The flexible touch screen panel of claim 2, wherein the first sensing cells have a mesh shape including a plurality of openings.

4. The flexible touch screen panel of claim 1, wherein the first sensing electrodes and the first position detection lines are formed of an opaque metal material.

5. The flexible touch screen panel of claim 1, wherein the second sensing electrodes include a plurality of second sensing cells arranged along the second direction, and second connection patterns connecting the second sensing cells to each other.

6. The flexible touch screen panel of claim 1, wherein the metallic nano-wires are formed as silver nano-wires (AgNW).

7. The flexible touch screen panel of claim 1, wherein the second sensing cells and the second connection patterns are implemented by patterning the conductive network layer formed in the uppermost layer of the compound.

8. The flexible touch screen panel of claim 1, wherein the first and second sensing electrodes are formed of different materials from each other.

9. A flexible touch screen panel, comprising:
a substrate divided into an active area, and at least one non-active area formed outside of the active area;
a plurality of first sensing electrodes arranged along a first direction and a plurality of second sensing electrodes arranged along a second direction in the active area;
a plurality of first and second position detection lines formed in the non-active area, and respectively connected to the plurality of first and second sensing electrodes; and
a pad portion formed in the non-active area, and having a plurality of pads electrically connected to the plurality of first and second position detection lines,
wherein the first and second sensing electrodes are formed of different materials from each other,
wherein the second sensing electrodes and the second position detection lines are formed by patterning a nano-metal conductive layer,
wherein the nano-metal conductive layer is formed of a compound having a stacked structure of a photosensitive organic layer and a conductive network layer configured with a plurality of metallic nano-wires,
wherein the non-active area comprises first and second non-active areas, and wherein the photosensitive organic layer is formed on a region overlapped with the active area and the first non-active area but not the second non-active area.

10. The flexible touch screen panel of claim 9, further comprising a plurality of first and second connecting portions formed on the second non-active area, and respectively connecting the plurality of first and second position detection lines and the pads corresponding thereto.

11. The flexible touch screen panel of claim 10, wherein the connecting portions are implemented into a multi-layered line structure.

12. The flexible touch screen panel of claim 10, wherein the first connecting portion is implemented with a first lower line formed on the substrate, and a first upper line overlapped with the first lower line and having one end extended on the photosensitive organic layer.

13. The flexible touch screen panel of claim 12, wherein the first lower line is implemented by extending, to the second non-active area, the first position detection line formed on the first non-active area of the substrate.

14. The flexible touch screen panel of claim 13, wherein the first upper line are simultaneously formed with the second sensing electrodes and the second position detection lines.

15. The flexible touch screen panel of claim 10, wherein the second connecting portion is implemented with a second lower line formed on the substrate and having one end partially extended beneath the photosensitive organic layer, and a second upper line overlapped with the second lower line and connected to the second position detection line formed on the photosensitive organic layer.

16. The flexible touch screen panel of claim 15, wherein the second upper line is implemented by extending, to the second non-active area, the second position detection line formed on the photosensitive organic layer of the first non-active area.

17. The flexible touch screen panel of claim 15, wherein the second lower line is simultaneously formed with the first sensing electrodes and the first position detection lines.

18. The flexible touch screen panel of claim 9, wherein the first sensing electrodes and the first position detection lines connected thereto are formed on one surface of the substrate, and the second sensing electrodes and the second position detection lines connected thereto are formed on the photosensitive organic layer.

* * * * *